United States Patent
Prasad et al.

(10) Patent No.: US 7,465,343 B2
(45) Date of Patent: Dec. 16, 2008

(54) INKJET INK FOR USE ON POLYMERIC SUBSTRATE

(75) Inventors: Ravi Prasad, Corvallis, OR (US); Paul McClelland, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 556 days.

(21) Appl. No.: 11/128,480

(22) Filed: May 13, 2005

(65) Prior Publication Data

US 2006/0256176 A1    Nov. 16, 2006

(51) Int. Cl.
  *C09D 11/02*    (2006.01)
(52) U.S. Cl. .............. 106/31.27; 106/31.47; 106/31.75; 106/31.86; 106/31.58; 106/31.6
(58) Field of Classification Search .............. 106/31.27, 106/31.6, 31.47, 31.75, 31.58, 31.86
  See application file for complete search history.

(56) References Cited

U.S. PATENT DOCUMENTS

| | | | |
|---|---|---|---|
| 4,069,076 A | | 1/1978 | Fickes |
| 4,113,918 A | | 9/1978 | Kogure et al. |
| 4,241,122 A | | 12/1980 | Asano |
| 4,279,846 A | | 7/1981 | Ishii et al. |
| 4,803,256 A | | 2/1989 | Luckenbach |
| 4,985,041 A | | 1/1991 | Matalon |
| 5,112,398 A | | 5/1992 | Kruse |
| 5,139,530 A | | 8/1992 | Blanchard et al. |
| 5,358,537 A | | 10/1994 | Kelly et al. |
| 5,576,366 A | | 11/1996 | Sheth |
| 5,594,044 A | * | 1/1997 | Yang .......................... 523/160 |
| 5,985,999 A | | 11/1999 | Dominguez et al. |
| 6,093,496 A | | 7/2000 | Dominguez et al. |
| 6,129,767 A | | 10/2000 | Hong |
| 6,146,574 A | | 11/2000 | Henkee et al. |
| 6,332,293 B1 | | 12/2001 | Kerr et al. |
| 6,381,995 B1 | | 5/2002 | Hong |
| 6,495,660 B2 | | 12/2002 | Long |
| 6,498,222 B1 | | 12/2002 | Kitamura et al. |
| 6,576,748 B1 | | 6/2003 | Carlini et al. |
| 6,663,703 B1 | | 12/2003 | Wu et al. |
| 6,705,702 B2 | | 3/2004 | Gunther et al. |
| 6,780,469 B2 | | 8/2004 | Iijima et al. |
| 6,869,986 B1 | * | 3/2005 | Millot et al. ................. 523/160 |
| 7,014,698 B2 | * | 3/2006 | Mizutani et al. ......... 106/31.86 |
| 7,081,158 B2 | * | 7/2006 | Sabys et al. .............. 106/31.58 |
| 2002/0005146 A1 | | 1/2002 | Palumbo et al. |
| 2003/0024433 A1 | | 2/2003 | Yu |
| 2004/0006234 A1 | | 1/2004 | Mayo et al. |
| 2004/0266907 A1 | * | 12/2004 | Sugita et al. ................. 523/160 |
| 2005/0066856 A1 | | 3/2005 | Lee et al. |
| 2005/0148688 A1 | * | 7/2005 | Mizutani et al. ............ 523/160 |

FOREIGN PATENT DOCUMENTS

| | | |
|---|---|---|
| EP | 0827973 A1 | 3/1998 |
| JP | 60096485 A | 5/1985 |
| JP | 61060774 A | 3/1986 |
| JP | 09296144 A | 11/1997 |
| JP | 10310728 A | 11/1998 |
| JP | 11198522 A | 7/1999 |

* cited by examiner

*Primary Examiner*—Jerry Lorengo
*Assistant Examiner*—Faison-Gee Veronica

(57) ABSTRACT

An ink for use in an inkjet printer and for printing on a polymeric substrate, comprises a swelling agent, selected and provided in sufficient amount to enable said colorant to enter the surface of the substrate, a colorant dispersed or dissolved in the swelling agent, and an inkjet-enabling additive. The swelling agent is selected and provided in sufficient amount to enable the colorant to enter the surface of the substrate.

20 Claims, No Drawings

INKJET INK FOR USE ON POLYMERIC SUBSTRATE

BACKGROUND

Inkjet printing is one of the most versatile and affordable printing methods available. Since its inception, inkjet technology has improved and proliferated to the point that it can be used in applications ranging from printing simple text documents to printing vivid, complex graphic designs on many types and sizes of paper, film, fabric and other media.

The inks used in inkjet printers can be either dye-based or pigment-based. Each type of ink offers distinct advantages. Dye-based inks use a liquid colorant that is often water-based. The dye tends to be absorbed into the surface of the printed medium, and turns the medium the color of the dye. Dye-based inks are typically more chromatic and provide more highly saturated colors than pigmented inks. Because of their composition, however, water-soluble dye-based inks are usually not water-resistant. They also tend to be more affected by UV light, making them vulnerable to fading or color change over time.

In contrast, pigmented inks use a solid colorant to achieve color. With pigmented inks, colorant particles remain on the surface of the print medium. Once the liquid in the ink has evaporated, the colorant particles will generally not go back into solution, and the resulting color is therefore more water-resistant. In many cases, the line quality and accuracy of plots produced by pigment-based inks are superior to those produced by dye-based inks. In addition, pigmented inks are more UV-resistant than dye-based inks, so that it typically takes longer for noticeable fading of pigment-printed media to occur.

For many types of substrates, such as paper or fabric, either type of ink will readily adhere to or be absorbed into the substrate surface. For polymeric substrates, however, such as plastic films or other plastic products, it is difficult to achieve desired image quality and durability, as polymeric surfaces tend to be resistant to dyes and other colorants. Many polymeric surfaces are resistant to the inks themselves and are difficult to dye because they lack dye sites to which dye molecules can attach. In addition, pigments that are applied to such polymeric surfaces tend to be vulnerable to erosion and/or damage due to wear.

For these reasons, it is desired to provide an inkjet ink that is suitable for use on nonporous plastic or polymeric substrates and provides a durable, high quality image on such substrates without the use of a surface treatment or an ink reception layer.

BRIEF SUMMARY

The problems noted above are solved in large part by providing an ink that is adapted for use in an inkjet printer and for printing on a polymeric substrate by including a swelling agent, a colorant dispersed or dissolved in the swelling agent; and an inkjet-enabling additive. The selection of swelling agent is dependent on the chemical composition of the substrate. The action of the swelling agent allows the colorant to enter the surface of the substrate, resulting in a wear-resistant image.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

As used herein, "swelling agent" refers to a liquid that is absorbed by a solid and causes the fibers, molecules, or particles of the solid to swell, expand, move apart, or untangle, thereby causing the solid to increase in volume.

As used herein, "non-water-swellable" refers to materials that do not swell in the presence of water.

As used herein, "solubility parameter" refers to the Hildebrand solubility parameter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The invention described herein is directed to inks that are particularly suitable for use in thermal inkjet printers for printing on polymeric substrates. The present inks can be used in commercially available inkjet printers such as Deskjet® printers manufactured by Hewlett-Packard Company of Palo Alto, Calif. In other embodiments, the present inks can be used in other types of inkjet printers.

Inkjet inks formulated in accordance with the present invention are suitable for use on non-water-swellable, non-porous plastic or polymeric substrates and provide a durable, high quality image on such substrates without the use of a surface treatment or an ink reception layer. In addition, because they result in an image that it integrated into the surface of the substrate, the present inkjet inks are waterfast and wear resistant and do not require the use of resin (polymerizable) or polymeric components in the ink. Because the present inks can be substantially free of these components, they offer advantages over resin-or polymer-containing inks.

Substrates

The polymeric substrates for which the present inks are contemplated include but are not limited to: polyurethanes, polypropylenes, polyethylenes, rigid or plasticised polyvinyl chlorides (PVCs), polystyrenes, acrylonitrile butadienestyrene (ABS), nylons (polyamides), saturated or unsaturated polyester resins, low density polyethylene (LDPEs), high density polyethylene (HDPEs), expanded polystyrene, expanded polyphenylethane, acrylics such as polymethyl methacrylate, and the like.

According to certain embodiments, an ink is formed by selecting a swelling agent and adding colorant(s) and an inkjet-enabling additive such as a bubble-forming agent to the selected swelling agent. If a dye-based ink is desired, the colorant (dye) may be soluble in the selected solvent. If a pigment-based ink is desired, the pigment may be dispersible in the selected solvent and the dispersion aid, if any is used, may also soluble in the selected swelling agent. If an additional liquid is used as a carrier, the colorant and the inkjet-enabling additive may or may not be soluble in the selected swelling agent. If no additional carrier is used, however, both the colorant and the inkjet-enabling additive are preferably soluble in the selected swelling agent.

Swelling Agents

According to certain embodiments, the swelling agent is selected on the basis of the composition of the polymeric substrate upon which it is desired to print. The swelling agent can be any liquid or combination of liquids that acts as a swelling agent for the material of which the substrate is made and may be a liquid in which the substrate material is soluble. Hence, either a solvent or a non-solvent having a solubility parameter close to the polymer can serve as a swelling agent. In certain embodiments, the ratio of solubility parameter of the swelling agent to the solubility parameter of substrate is between 0.8 to 1.2. Regardless of whether an additional liquid is used as a carrier, the swelling agent is preferably present in sufficient amount to enable the colorant to enter the surface of the substrate to a desired degree.

Swelling agent(s) suitable for use in the present invention may include, for example, organic compounds such as lower alcohols such as methanol, ethanol, n-propyl alcohol, phenols, isopropanol, n-butyl alcohol, sec-butyl alcohol and tert-butyl alcohol; amides such as dimethylformamide and dimethylacetamide; ketones or ketoalcohols such as acetone and diacetone alcohol; polyalkylene glycols such as polyethylene glycol and polypropylene glycol; alkylene glycols such as ethylene glycol, propylene glycol, butylene glycol, diethylene glycol, triethylene glycol, tetraethylene glycol, dipropylene glycol, tripropylene glycol, thiodiglycol and hexylene glycol; 1,5-pentanediol; glycerol; 2-pyrrolidone; N-methyl-2-pyrrolidone; and 1,3-dimethyl-2-imidazolidinone.

Suitable swelling agents further include: alkyl ethers and substituted alkyl ethers such as halo- or hydroxy-substituted alkyl ethers including ethers of alkylene glycols, arylethers, arylalkylethers, cyclic ethers and their derivatives. Lower alkyl and lower alkylene moieties of 1-20 and 2-20 carbon atoms respectively are particularly suitable. Aryl moieties such as phenyl and substituted phenyl may be used. Specific examples include solvents such as propanediol dimethylether, ethoxyacetic acid, methoxyethylether, 2-(2-amino ethoxy)ethanol, 1,2-bis(2-chloroethoxy)ethane, 1,4-butanediol diglycidyl ether, 2-(2-n-butoxyethoxy)ethanol, 2-(2-chloroethoxy)ethanol, 2-[2-(2-chloroethoxy)ethoxy]ethanol, diethylene glycol dibutyl ether, 2-(2-ethoxy ethoxy)ethanol, 2-ethoxyethyl ether, ethylene glycol dimethyl ether, diethyleneglycol dimethylether, dipropylene glycol dimethylether, 2-methoxyethylether(diglyme), dimethoxy propane, ethoxy ethylether, butylphenylether, 2-(2-methoxyethoxy)ethanol, tetraethylene glycol dimethyl ether, triethylene glycol dimethyl ether and polyethylene glycol. Benzyl ether, phenyl ether, benzoxy benzyl alcohol, methoxy benzyl alcohol can be used, as can cyclic ethers and their derivatives, such as benzofuran, butanediol diglycidyl ether, dioxane and substituted dioxanes, trioxanes and substituted trioxanes, furans, furfuryl alcohol, morpholines and substituted morpholines such as dimethylamino ethylmorpholine, ethylmorpholine, 4-morpholineethane sulfonic acid, 4-methylmorpholine-N-oxide), tetrahydrofuran and substituted tetrahydrofurans such as dimethoxy hydrofuran or dimethoxy tetrahydrofuran. Finally, aldehydes, acetals and ketals derived from lower alkanols and lower alkanoic acids having from 1 to 6 carbon atoms. Included in this category are phenylacetaldehyde, glyceraldehyde, benzylacetone, dichloroacetone, methoxyacetone, benzophenone, propionaldehyde diethyl acetal, dioxolane, and trioxane may also be used.

Water miscible halocarbons that can be used as swelling agents include mono- and poly-, chloro- and fluoro-substituted derivatives of acetone, acetic acid, butanol, ethanol, and propanol.

Also suitable for use as swelling agents are alkanolamines and phenolamines such as benzyl-N-methylethanolamine, diethylaminophenol, 2-[(2-dimethylamino)ethyl]methyl aminoethanol, ethanolamine, diethanolamine, dimethyethanolamine, butyidi-ethanolamine, triethanolamine, 5-diethylamino-2-pentanol, diethyl-ethanolamine, dialkoxy benzene, dimethylamino propanol, dimethylethanolamine, chloroethoxyethanol, tetra kis(2-hydroxyethyl)ethylenediamine, tripentaerythritol, 2,4,6-tris(dimethylaminomethyl)phenol. Also suitable are tertiary amines such as pyridine and substituted pyridines for example dialkylaminopyridines, aniline and substituted anilines, for example dialkylanilines, hexamethylenetetraamine, tetramethylethylenediamine, tetra-ethylenepropanediamine. Finally, ether-amines such as tris(2-methoxyethoxy-ethyl)amine,benzethonium,4(2-dimethylamino)ethylmorpholine, glycerol, isopro-panol, acetic acid, palmitic acid, benzoic acid, benzene sulfonic acid and dimethyl formamide.

Additional Ink Components

Once the swelling agent is selected, an inkjet-enabling additive is selected. If the ink is to be used in a thermal inkjet printer, the inkjet-enabling additive is a bubble-forming agent. The bubble-forming agent should be soluble in the selected swelling agent. Suitable bubble-forming agents are known and include but are not limited to isopropanol and other alcohols. If the ink is going to be used in a piezo-type inkjet printer instead of a thermal inkjet printer, the inkjet-enabling agent would comprise a piezo-enabler, which could comprise a viscosity modifier and/or a surface tension modifier, such as are known in the art.

The colorant, a dye or pigment, is also selected so as to be readily incorporated into the ink. Suitable dyes are soluble in the swelling agent. Low molecular weight dyes are particularly effective. Pigment, if used, may be dispersible in the swelling agent, or may be used in conjunction with a stabilizer and/or a solubilizer in order to keep the pigment dispersed in the ink. Like the bubble-forming agent, these additives should be soluble in the solvent.

A buffer may optionally be employed in present inks so as to maintain the pH of the ink within a desired range if the printed substrate is hydrophilic in nature. Suitable buffers can be organic-based biological buffers or inorganic buffers. Examples of suitable buffers include tris(hydroxymethyl) aminomethane (TRIS), available from Aldrich Chemical (Milwaukee, Wis.), 4-morpholine-ethanesulfonic acid (MES), 4-morpholinepropane-sulfonic acid (MOPS), and beta-hydroxy-4-morpholinepropanesulfonic acid (MOPSO).

If desired, any of the biocides commonly employed in inkjet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250.

In instances where the invention is applied in an aqueous ink, the ink may optionally also include a metal chelator. Such chelators are used to bind transition metal cations that may be present in the ink. Examples of preferred metal chelators include: ethylenediaminetetraacetic acid (EDTA), diethylene-diaminepentaacetic acid (DPTA), trans-1,2-diaminocyclohexanetetraacetic acid (CDTA), ethylene-dinitrilotetraacetic acid (EGTA), or other chelators.

Lastly, inks according to the invention may also include lightfastness additives in appropriate amounts known to those of skill in the art. For example, free radical scavengers may be added to enhance resistance of the ink to UV damage.

The ink compositions of the present invention are suitably employed with any inkjet printer for any drop on demand or continuous ink jet technology. They are also useful in piezoelectric ink jet technology.

Operation

Once the ink has been formed according to the foregoing techniques, it can be loaded into an inkjet printer. When the ink containing the swelling agent contacts the surface of the polymeric substrate, the swelling agent causes the molecules near the surface of the substrate to loosen relative to each other and to swell, thereby allowing the colorant to penetrate into the surface of the substrate itself. This results in a layer of embedded color at the surface of the substrate. This color layer is more durable and therefore longer-lasting than color applied to polymeric substrates using conventional inks. Thus the present inks provide waterfast and wear-resistant images without the use of resin or polymeric components in the ink.

The above discussion is meant to be illustrative of the principles and various embodiments of the present invention. Numerous variations and modifications will become apparent to those skilled in the art once the above disclosure is fully appreciated. For example, the present inks can be used in various types of printers and for various types of substrates. It is intended that the following claims be interpreted to embrace all such variations and modifications.

What is claimed is:

1. An ink for use in an inkjet printer and for printing on a non-water-swellable insoluble polymeric substrate, comprising:
   a swelling agent, selected and provided in sufficient amount to enable said colorant to enter the surface of the substrate;
   a colorant dispersed or dissolved in the swelling agent; and
   an inkjet-enabling additive; and
   wherein said ink excludes a resin.

2. The ink according to claim 1 wherein the inkjet-enabling additive is selected from the group consisting of bubble-forming agents, viscosity modifiers, surface tension modifiers, and combinations thereof.

3. The ink according to claim 1, wherein the colorant is a dye.

4. The ink according to claim 1, wherein the colorant is a pigment.

5. The ink according to claim 1 wherein the swelling agent is a solvent for the polymeric substrate.

6. The ink according to claim 1 wherein the ratio of the solubility parameter of the swelling agent to the solubility parameter of substrate is between 0.8 to 1.2.

7. The ink according to claim 1 wherein the swelling agent is dimethylformamide.

8. The ink according to claim 1 wherein the inkjet-enabling additive is an alcohol.

9. A method for making an inkjet ink for printing on a non-water-swellable polymeric substrate, comprising:
   mixing a swelling agent with a colorant and an inkjet-enabling additive;
   wherein the colorant and the inkjet-enabling additive are dispersed or dissolved in the swelling agent, in the absence of a resin.

10. The method according to claim 9, further including the step of selecting a solvent for the polymeric substrate as the swelling agent.

11. The method according to claim 9 wherein the inkjet-enabling additive is selected from the group consisting of bubble-forming agents, viscosity modifiers, surface tension modifiers, and combinations thereof.

12. The method according to claim 9, wherein the colorant is a pigment.

13. The method according to claim 9, wherein the colorant is a dye.

14. The method according to claim 9 wherein the ratio of the solubility parameter of the swelling agent to the solubility parameter of substrate is between 0.8 to 1.2.

15. A method for printing an image on a non-water-swellable polymeric substrate using an inkjet printer, comprising:
   providing an inkjet ink comprising a swelling agent, a colorant and an inkjet-enabling additive, and excluding a resin, wherein the swelling agent comprises a solvent for the polymeric substrate, and wherein the colorant and the inkjet-enabling additive are dispersed or dissolved in the swelling agent;
   deploying the inkjet ink using an inkjet printer that acts on the inkjet-enabling additive.

16. The method according to claim 15, further including the step of selecting the swelling agent on the basis of the composition of the polymeric substrate.

17. The method according to claim 15 wherein the inkjet-enabling additive is selected from the group consisting of bubble-forming agents, viscosity modifiers, surface tension modifiers, and combinations thereof.

18. The method according to claim 15, wherein the colorant is a dye.

19. The method according to claim 15, wherein the colorant is a pigment.

20. The method according to claim 15 wherein the ratio of the solubility parameter of the swelling agent to the solubility parameter of substrate is between 0.8 to 1.2.

* * * * *

UNITED STATES PATENT AND TRADEMARK OFFICE
CERTIFICATE OF CORRECTION

PATENT NO. : 7,465,343 B2
APPLICATION NO. : 11/128480
DATED : December 16, 2008
INVENTOR(S) : Ravi Prasad et al.

It is certified that error appears in the above-identified patent and that said Letters Patent is hereby corrected as shown below:

In column 4, line 9, delete "butyidi" and insert -- butyldi --, therefor.

Signed and Sealed this

Twenty-ninth Day of June, 2010

David J. Kappos
*Director of the United States Patent and Trademark Office*